United States Patent [19]

Gosteli

[11] 4,151,170
[45] Apr. 24, 1979

[54] PROCESS FOR THE MANUFACTURE OF INDIGOID DYES

[75] Inventor: Jacques Gosteli, Basel, Switzerland

[73] Assignee: Ciba-Geigy AG, Basel, Switzerland

[21] Appl. No.: 751,223

[22] Filed: Dec. 16, 1976

[30] Foreign Application Priority Data

Dec. 24, 1975 [CH] Switzerland ............ 16782/75

[51] Int. Cl.² ............................................. C09B 7/00
[52] U.S. Cl. ................................. 260/323; 260/321
[58] Field of Search ............ 260/323, 288 CF, 323; 544/31

[56] References Cited

U.S. PATENT DOCUMENTS

| | | | |
|---|---|---|---|
| 643,502 | 1/1900 | Holt et al. | 260/323 |
| 662,073 | 11/1900 | Koetschet et al. | 260/323 |
| 768,455 | 8/1904 | Homolka et al. | 260/323 |
| 1,015,495 | 1/1912 | Koetschet et al. | 260/323 |
| 1,567,158 | 12/1925 | Mayer et al. | 260/320 |
| 1,854,460 | 4/1932 | Dreyfus | 260/323 |

Primary Examiner—Ethel G. Love
Attorney, Agent, or Firm—Prabodh I. Almaula

[57] ABSTRACT

A process for the manufacture of indigoid dyes, wherein a functional derivative of the anthranilic acid of the general formula I

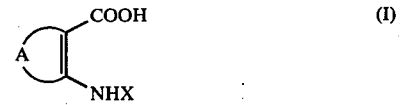

in which
  A completes a mono- or polynuclear, substituted or unsubstituted aromatic ring,
  X represents a hydrogen atom or a protective group for the free amino group which can form an anhydro derivative with the carboxyl group in the ortho-position, is reacted with nitromethane in the presence of a base or with a salt of nitroacetic acid to give the ω-nitro-o-amino-acetophenone derivative of the general formula II

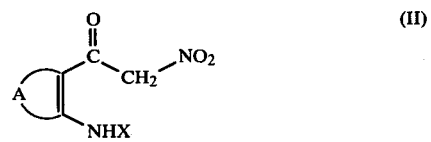

in which A and X are as defined in formula I, and this intermediate is condensed by heating with acids to give the indigo compound of the general formula III

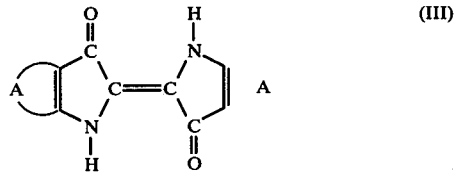

in which A is as defined in formula I.

9 Claims, No Drawings

PROCESS FOR THE MANUFACTURE OF INDIGOID DYES

The present invention provides a novel process for the manufacture of indigoid dyes.

Surprisingly, it has been found that indigoid dyes are obtained by reacting a functional derivative of the anthranilic acid of the general formula I

wherein
- A completes a mono- or polynuclear, substituted or unsubstituted aromatic ring,
- X represents a hydrogen atom or a protective group for the free amino group which can form an anhydro derivative with the carboxyl group in the ortho-position, with nitromethane in the presence of a base or with a salt of nitroacetic acid to give the ω-nitro-o-aminoacetophenone derivative of the general formula II

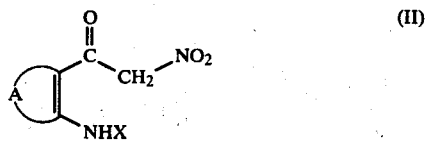

wherein A and X are as defined in formula I, and condensing this intermediate by heating with acids to give the indigo compound of the general formula III

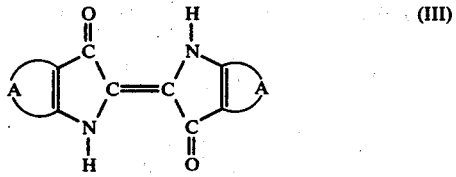

wherein A is as defined in formula I.

Suitable salts of nitroacetic acid are the alkaline earth metal salts, but in particular the alkaline metal salts, for example the sodium salts.

The substituted or unsubstituted radical A in formulae I, II and III preferably completes a mono- or polynuclear aromatic homocyclic ring, for example a benzene ring, a naphthalene, anthracene, phenanthrene, fluorene, acenaphthene or pyrene ring system. However, A can also complete a heterocyclic ring system of aromatic character, for example a quinoline or phenothiazine ring system.

If A is mono- or polysubsituted, the substituents can be for example alkylene groups, for example the 1,4-tetramethylene group, aliphatic, cycloaliphatic, araliphatic or aromatic hydrocarbon radicals; etherified hydroxyl groups, for example alkoxy, cycloalkoxy, aralkoxy groups, in particular lower alkoxy groups, for example methoxy and ethoxy groups, or aryloxy groups, for example the phenoxy group. Cycloalkoxy groups are for example cyclopentyl or cyclohexyloxy groups.

An aliphatic hydrocarbon radical contains preferably not more than 7 carbon atoms and is for example a lower alkyl, lower alkenyl or lower alkinyl group.

Examples of lower alkyl groups are: methyl, ethyl, n-propyl, iso-propyl, n-butyl, iso-butyl, sec.-butyl, tert.-butyl, n-pentyl, iso-pentyl, neopentyl, n-hexyl, iso-hexyl or n-heptyl groups. Examples of lower alkenyl groups are allyl or 2-methallyl groups and lower alkinyl groups are preferably propargyl groups. Substituted lower alkyl groups are for example the trifluoromethyl group or an optionally esterified carboxymethyl group, for example an alkoxycarbonylmethyl group.

A cycloaliphatic hydrocarbon radical contains preferably 5 to 7 ring carbon atoms and is for example a cycloalkyl group, for example a cyclopentyl or cyclohexyl group.

Araliphatic hydrocarbon radicals contain preferably 7 to 9 carbon atoms and contain as aryl radical preferably the phenyl radical, which is attached to an aliphatic hydrocarbon radical, in particular an alkyl group, for example a lower alkyl group. An araliphatic radical is in particular the benzyl group.

Suitable aromatic hydrocarbon radicals are in particular mono- or polynuclear aromatic radicals of the benzene series, for example a phenyl or naphthyl radical.

Further substituents of the radical A are halogen atoms, for example fluorine, chlorine or bromine atoms.

In the above mentioned substituents, aromatic rings can for their part accordingly be substituted.

An amino protective group X is a group which can be replaced by a hydrogen atom, and is especially an acyl group. An acyl group is chiefly the acyl radical of an organic carboxylic acid, in particular the acyl racical of a substituted or unsubstituted aliphatic, cycloaliphatic, cycloaliphatic-aliphatic, aromatic, araliphatic carboxylic acid, and the acyl radical of a carbonic acid hemiester or of carbonic acid, for example the carboxyl group.

Acyl radicals of aliphatic or aromatic carboxylic acids are for example alkanoyl or aroyl radicals, for example formyl, acetyl and propionyl radicals, or the benzoyl group.

An easily eliminable acyl radical of a carbonic acid hemiester which is a suitable amino protective group is for example a lower alkoxycarbonyl group, for example the methoxy or ethoxycarbonyl group.

If X as a carboxyl group forms an inner anhydride as anhydro compound with the second carboxyl group in the ortho-position, as for example occurs with a derivative of isatoic anhydride, then the carboxyl group which forms at the amino group during the reaction acts as the protective group which can be easily removed. For this reason, derivatives of isatoic anhydride are extremely suitable as the functional derivatives of anthranilic acid which are used as starting materials for the synthesis of indigoid dyes of the present invention.

Further starting materials in which the protective group X forms an anhydro compound with the carboxyl group in the ortho-position, are anhydro compounds of N-acylanthranilic acids, in particular of N-acetylanthranilic acid, for example 2-methyl-4H-3,1-benzoxazin-4-one (acetylanthranil).

Esters, in particular lower alkyl esters, for example methyl or ethyl esters, can be used for example as functional derivatives of the anthranilic acid of the general formula I, in which case, however, the amino group must be substituted by a protective group X, for example an acyl group.

Alkali metal derivatives which as strong bases are responsible for the formation of the anion of dimethyl sulphoxide (dimsyl) used for the reaction, can be for example alkali metal hydrides, for example sodium hydride, alkali metal amides, such as sodium amide, and alkali metal alcoholates of a lower alkanol, for example sodium methylate, sodium ethylate and sodium tert.-butylate.

The reaction of the derivative of the anthranilic acid of the general formula I with nitromethane can be carried out at room temperature, preferably however at slightly elevated temperature (45°–50° C.) to the reflux temperature of the reaction mixture. The reaction can be carried out in an aprotic solvent, for example dioxane, in dimethyl formamide or in hexamethylphosphoric triamide in the presence of a base, for example in the presence of an alkali metal derivative previously mentioned above, but preferably in the presence of a simple alkali base, for example sodium carbonate or sodium acetate. The resultant ω-nitro-o-amino-acetophenone derivative of the formula II is condensed by heating with acids, with attendant removal of nitric oxide, to give the indigo of the formula II.

The nitric oxides liberated during the elimination are accompanied by nitrous gases. The addition of urea or the introduction of a strong flow of air prevents the ω-nitro-o-acetophenone derivative of the formula II obtained as intermediate from being diazotised or subjected to a side-reaction by liberated nitrous gases and nitrous acid formed therefrom. Suitable acids for the rearrangement and for the condensation to form the indigo are for example aqueous organic acids, for example aqueous arylsulphonic acids, such as p-toluenesulphonic acid, but are advantageously aqueous inorganic acids, in particular mineral acids, for example dilute or concentrated hydrochloric or sulphuric acid.

The intermediates formed in the reaction sequence, the ω-nitro-o-amino-acetophenone derivatives of the formula I, can be isolated; but it is simpler and more advantageous to carry out the reaction sequence without isolating the intermediates. The process is characterised by the simple and easy manner in which it can be carried out, with particular regard to the fact that the intermediates need not be isolated.

Compounds of the formula II, in particular however the compounds of the formulae IIa and IIb

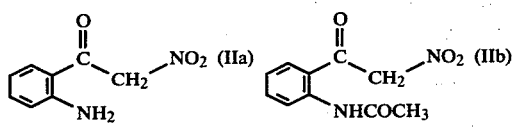

can be used in solution, for example in aqueous or alkaline solution, for printing with an indigoid dye on cellulosic materials of fibrous structure, for example cotton or rayon, or on other material to be dyed. If the fibres or substrates used are acidified, the rearrangement and condensation to give the indigoid dye takes place.

The compounds of the general formul II can likewise be used as intermediates in sealed forms (for example bags, sacks, or also capsules) which are made of a material that dissolves in the same medium as the contents.

This utility has many advantages for applicatory use. Thus, for example, water-soluble intermediates of the formula II, in particular of the formulae IIa and IIb, can be sealed in water-soluble wrappings (for example polyvinyl alcohol sheeting).

The invention is illustrated by the following Examples, in which the parts and percentages are by weight.

EXAMPLE 1

(a) 360 mg of ω-nitro-o-amino-acetophenone are dissolved at ice bath temperature in a solution of 500 mg of urea in 10 ml of 0.3 sodium hydroxide solution. The clear yellow solution is treated with 12 ml of 6 N sulphuric acid, whereupon the colour disappears. After it has been allowed to stand for a further 30 minutes, the reaction mixture is stirred for the same length of time in a bath of 80° C. and the indigo precipitates. The cooled suspension is filtered and the product is washed with a copious amount of water, then with methanol and ether. Identification is made by means of $IR_{KBr}$ spectrum. Yield: 174 mg (66% of theory).

(b) The ω-nitro-o-amino-acetophenone used as intermediate is prepared as follows:

A mixture of 16.3 g of isatoic anhydride (100 mmol) and 26.5 g (250 mmol) of anhydrous sodium carbonate is heated in 140 ml of hexamethylphosphoric triamide to 75°–80° C. and a solution of 10.8 ml of nitromethane (d=1.134; 200 mmol) in 50 ml of hexamethylphosphoric triamide is added dropwise in the course of one hour. The reaction mixture is stirred for 12 hours at the given temperature, allowed to cool, then poured into 400 ml of water and the resultant solution is extracted with four 200 ml portions of chloroform (in order to recover the solvent). Thereafter the aqueous layer is adjusted to a pH of 2 by adding concentrated hydrochloric acid and the product is extracted with methylene chloride (4 extracts of 150 ml). The combined extracts are washed with an aqueous solution of sodium chloride, dried over sodium sulphate, concentrated to approx. 50 ml and passed through a column of 160 g of silica gel (silica gel 60, Merck, granular size 0.063 to 0.200 mm). The eluate is concentrated and yields 6.8 g of ω-nitro-amino-acetophenone with a melting point of 110°–111° C.

EXAMPLE 2

720 mg of ω-nitro-o-amino-acetophenone are dissolved in 20 ml of 0.3 N NaOH and the ice-cooled stirred solution is treated with 24 ml of 6 N sulphuric acid. The mixture is heated for 30 minutes to 80° C. (bath temperature). After cooling, the precipitate which has formed is collected with suction, washed with water, methanol and ether, and dried. Yield: 304 mg of indigo (58% of theory).

EXAMPLE 3

720 mg of ω-nitro-o-amino-acetophenone are dissolved in 12 ml of 6 N sulphuric acid. The solution is diluted with water and stirred for 30 minutes in a bath of 80° C. Thereafter the procedure described above is carried out. Yield: 383 mg of indigo (73% of theory).

EXAMPLE 4

10.8 g (60 mmol) of ω-nitro-o-amino-acetophenone are added to 20 ml of acetic anhydride and the mixture is heated to 60° C. After a brief time, the N-acetyl derivative begins to crystallise out of the clear yellow solution. The resultant crystalline slurry is kept for a further half an hour at 60° C. and undergoes conversion into a solid mass which is no longer stirrable. Then 400 ml of 2 N hydrochloric acid are poured over this mass and the resultant suspension is heated to 75°–80° C. in the course of 15 minutes. Stirring is continued at this temperature for 3 hours. A light flow of air is passed over the slightly foaming reaction mixture in order to remove nitrous gases. After the reaction mixture has cooled, the precipitated indigo is collected with suction, washed with water, acetone and ether and dried in a current of air at 150° C. Yield: 6.9 g of indigo (88% of theory).

EXAMPLE 5

A mixture of 1 g (6.20 mmol) of 2-methyl-1,3-benzoxazinone-6, 1.64 g (15.5 mmol) of anhydrous sodium carbonate, 0.76 g (12.4 mmol) of nitromethane and 15 ml of hexamethylphosphoric triamide is heated for 2 hours to 80° C. After the mixture has cooled, it is extracted with 100 ml of water and 50 ml of ethyl acetate and the ester layer is separated. The aqueous phase, which is extracted with a further 50 ml of ethyl acetate, is adjusted to a pH of 1 with concentrated hydrochloric acid and again extracted with two 50 ml portions of ethyl acetate. The combined extracts are washed with water, dried over magnesium sulphate and concentrated. The residue (yellowish-brown crystals) is recrystallised from 20 ml of ethyl acetate. Further purification is effected by dissolving the product once more in ethyl acetate and filtering the solution through a column of silica gel to yield ω-nitro-o-amino-acetamino-acetophenone with a melting point of 178°–179° C.

I claim:

1. A process for the manufacture of indigo Compounds wherein a functional derivative of the anthranilic acid of the general formula I

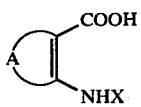

in which
A is unsubstituted or substituted benzene, naphthalene, anthracene, phenanthrene, fluorene, acenaphthene, pyrene, quinoline or phenothiazine, wherein the substituent is selected from the group consisting of alkylene, aliphatic, cycloaliphatic, araliphatic or aromatic hydrocarbon radicals, etherified hydroxyl groups and halogen atoms, x represents a hydrogen atom or a protective group for the free amino group which can form an anhydro derivative with the carboxyl group in the ortho-position, said protective group being the acyl radical of a substituted or unsubstituted aliphatic, cycloaliphatic, cycloaliphtic-aliphatic, aromatic, araliphatic carboxylic acid or of a carbonic acid hemiester or carbonic acid, is reacted with nitromethane in the presence of a base selected from the group consisting of alkali metal hydrides, alkali metal amides, alkali metal alcoholates of lower alkanols or alkali base or with a salt of nitroacetic acid to give the ω-nitro-o-amino-acetophenone derivative of the general formula II

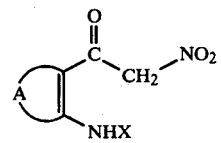

in which A and X are as defined in formula I, and this intermediate is condensed by heating with aqueous organic or inorganic acid to give the indigo compound of the general formula III

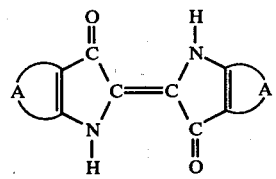

in which A is as defined in formula I.

2. A process according to claim 1, wherein the reactions are carried out without isolating the intermediates.

3. A process according to claim 1, wherein an alkali metal hydride is used as base for the reaction of a compound of the general formula I with nitromethane.

4. A process according to claim 1, wherein an alkali metal amide is used as base for the reaction of a compound of the general formula I with nitromethane.

5. A process according to claim 1, wherein an alkali metal alcoholate of a lower alkanol is used as base for the reaction of a compound of the general formula I with nitromethane.

6. A process according to claim 1, wherein an aqueous inorganic or organic acid is used as acid for the reaction of a compound of the general formula II to give the indigo compound of the general formula III.

7. A process according to claim 1, wherein isatoic anhydride is used as functional derivative of the anthranilic acid of the general formula I for the reaction with nitromethane or a salt of nitroacetic acid.

8. A process according to claim 1, wherein an ester of N-acetyl-anthranilic acid is used as functional derivative of the anthranilic acid of the general formula I for the reaction with nitromethane or a salt of nitroacetic acid.

9. A process according to claim 1, wherein the reaction of a functional derivative of the anthranilic acid with nitromethane or a salt of nitroacetic acid is carried out in an aprotic solvent.

* * * * *